(12) United States Patent
Decker

(10) Patent No.: US 6,704,806 B1
(45) Date of Patent: Mar. 9, 2004

(54) METHOD AND DEVICE FOR MONITORING THE CREATION AND DESTRUCTION OF CHILD PROCESSES WITHIN AN APPLICATION EXECUTING IN A COMPUTER SYSTEM

(75) Inventor: F. Jay Decker, Enumclaw, WA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/321,006

(22) Filed: May 27, 1999

(51) Int. Cl.[7] ................................................ G06F 9/54
(52) U.S. Cl. ...................................... 709/324; 717/127
(58) Field of Search ................................. 709/100–108, 709/310–320, 321, 324, 327, 328, 329; 717/124–133

(56) References Cited

U.S. PATENT DOCUMENTS

| | | | |
|---|---|---|---|
| 5,404,529 A | | 4/1995 | Chernikoff et al. ......... 395/700 |
| 5,517,655 A | * | 5/1996 | Collins et al. ............... 345/736 |
| 5,544,316 A | | 8/1996 | Carpenter et al. ...... 395/200.03 |
| 5,551,037 A | * | 8/1996 | Fowler et al. ............... 709/313 |
| 5,784,616 A | | 7/1998 | Horvitz ....................... 395/672 |
| 5,801,690 A | * | 9/1998 | Ayoub et al. ............... 345/755 |
| 5,835,765 A | | 11/1998 | Matsumoto .................. 395/672 |
| 5,835,911 A | | 11/1998 | Nakagawa et al. .......... 707/203 |
| 5,881,221 A | | 3/1999 | Hoang et al. .......... 395/183.18 |
| 6,223,203 B1 | * | 4/2001 | O'Donnell et al. .......... 709/102 |
| 6,385,663 B2 | * | 5/2002 | Senator ....................... 709/325 |
| 6,480,877 B1 | * | 11/2002 | O'Donnell et al. .......... 709/100 |
| 6,496,864 B1 | * | 12/2002 | McCartney .................. 709/226 |

OTHER PUBLICATIONS

Multithreaded Programming Guide, 1994, Sun Microsystems, Inc., Multithreading Basics, pp. 11–19.
Solaris SunOS 5.0, M.L. Powell, S.R. Kleiman, S. Barton, D. Shah, D. Stein, M. Weeks, 1991, Sun Microsystems, Inc., pp. 16–19.
*Microsoft® Windows® 95 Resource Kit*, Microsoft® Press, 1995, pp. 965–990.

* cited by examiner

Primary Examiner—St. John Courtenay, III
(74) Attorney, Agent, or Firm—Cooper & Dunham LLP (57) ABSTRACT

A method and a virtual device driver for monitoring the creation and destruction of child processes or threads within an application executing in a computer system controlled by an operating system, such as Windows. A list is provided for storing existing child process database structures corresponding to child processes existing within the executing application. The list is checked periodically. If, when checked, the list has no entries, it is safe to assume that the existing child process and, possibly, related grandchild processes, have exited and execution of the application is complete. Other applications in a series of applications, for example, during the installation of a software program, may then be executed with minimal risk of corruption due to concurrent execution of the applications in the series.

65 Claims, 7 Drawing Sheets

METHOD AND DEVICE FOR MONITORING THE CREATION AND DESTRUCTION OF CHILD PROCESSES WITHIN AN APPLICATION EXECUTING IN A COMPUTER SYSTEM

TECHNICAL FIELD

The present invention relates generally to tracking process creation during execution of a software application. More particularly, the present invention relates to monitoring the creation and destruction of child processes and grand-child processes of an executing application.

BACKGROUND

Figure 1:
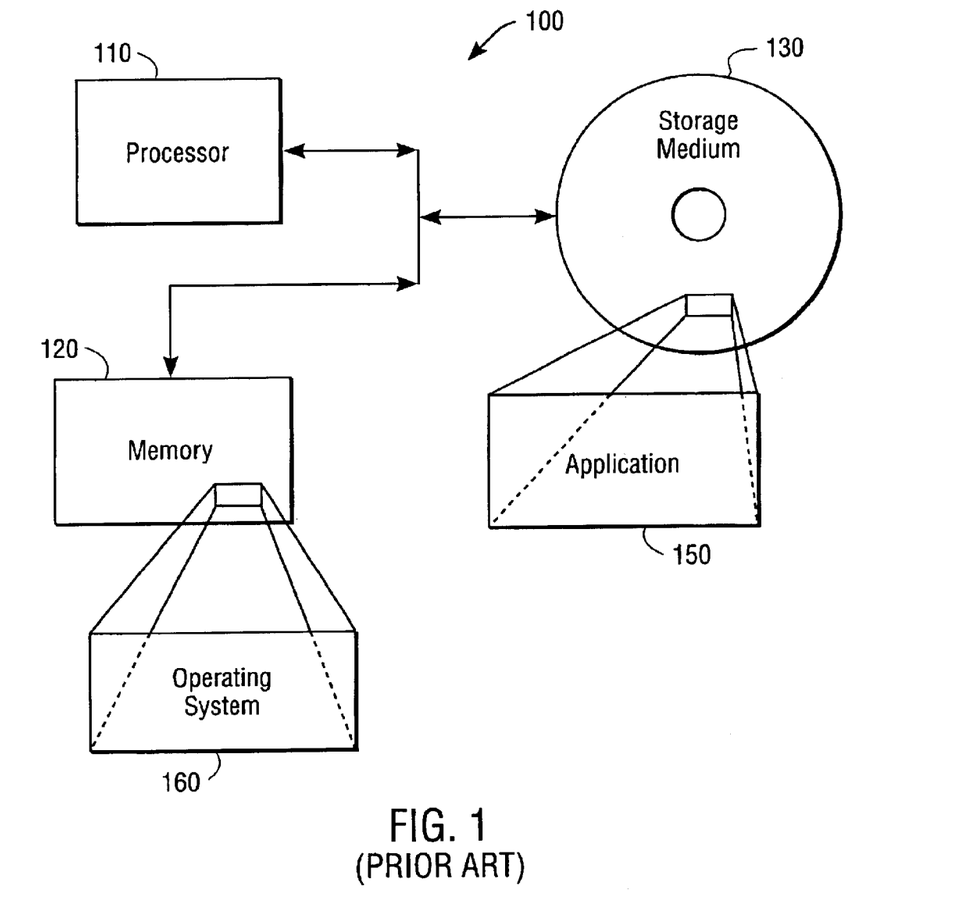
FIG. 1 is a generalized block diagram of a conventional computer system 100.

A conventional computer system 100 is illustrated in FIG. 1, and has several hardware components, including a processor 110 such as a central processing unit (CPU), a memory 120 such as RAM, and a non-volatile storage medium 130, all in communication with one another. Other hardware components not shown include disk drives, network devices, and other hardware devices known to those skilled in the art.

Conventional computer system 100 further includes software programs which may be stored on and executed using the several hardware components 110, 120, 130. Specifically, the software in computer system 100 includes application 150, which resides in storage medium 130, operating system 160, stored in memory 120, and possibly other applications or programs stored in storage medium 130 and memory 120. When the computer is active, application 150 may be found in memory 120. When the computer is off, operating system 160 may be found in storage medium 130. Thus, operating system 160 may be stored in various locations, as should be understood by those skilled in the art.

Application 150 and operating system 160 interact with one another and possibly other software in system 100 to provide data access to a user and to control other hardware and software in system 100 as designated by the user. The user of computer system 100 executes application 150 by instructing operating system 160 to execute, or "run," application 150. Operating system 160 then executes the requested application 150, and possibly other programs interleaved with application 150, using memory 120, processor 110, and other devices available to computer system 100.

Operating system 160 may be any conventional operating system known to those skilled in the art. Popular conventional operating systems used in personal computers include 32-bit Windows ("Win32") operating systems such as those made by Microsoft Corp. These include Microsoft Windows NT, Windows 95 and Windows 98. Other conventional operating systems which may be used as operating system 160 include UNIX for use with workstations, and DOS for use with personal computers.

A Win32-based application running in the system is called a "process" in terms of the operating system. Each process consists of at least a single thread of execution to be run by the operating system. A thread is a unit of code that can get some operating time from the operating system to run concurrently with other units of code, and must be associated with a process.

Win32-based applications can take advantage of various techniques provided by Windows operating systems to facilitate the ability to run applications concurrently. One of these concurrency techniques is "multi-threading," in which portions of one or more processes, or "threads", are separately and concurrently executable.

Executing two separate threads concurrently, however, is sometimes not particularly efficient. These inefficiencies arise where one executing application or process, the "parent" process, spawns another "child" process, and particularly where the child process spawns grandchild processes. Such situations may present problems where the parent process is one of a series of processes or applications to be executed. For example, the parent process may terminate before one or more of its child processes or grandchild processes have terminated. If execution of some other application commences while the child processes of the terminated parent processes are still active, corruption may result in some computer systems, notwithstanding the multi-threading techniques provided by operating systems such as Windows 95.

Figure 2:
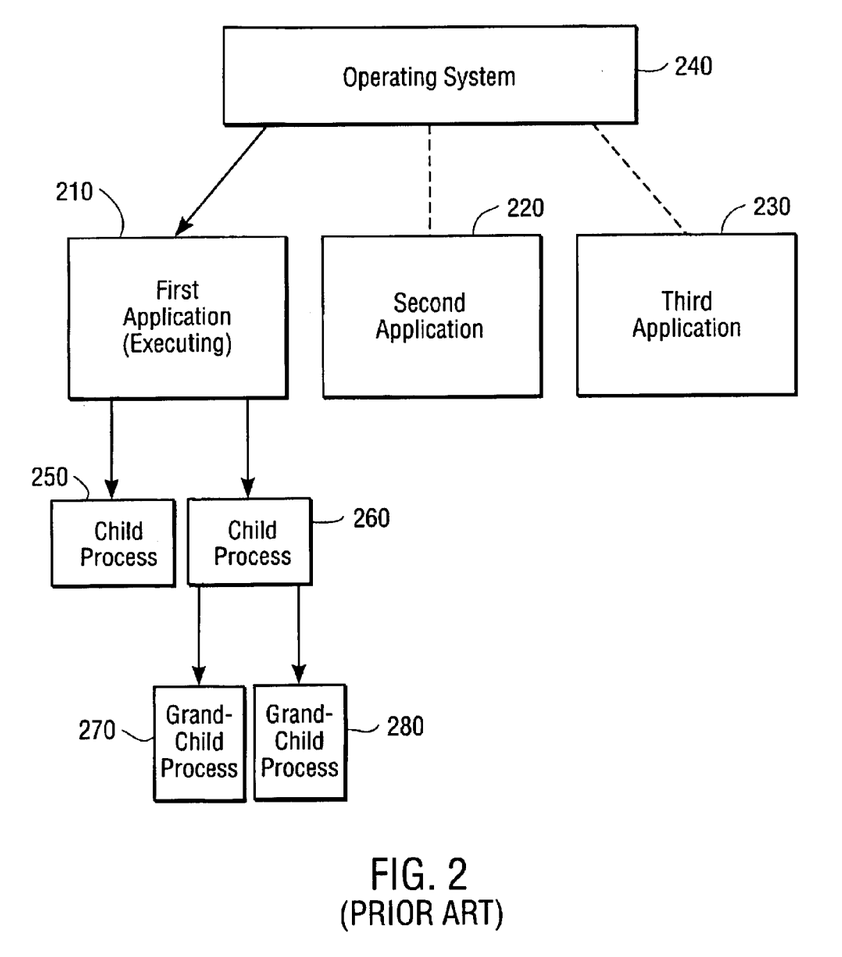
FIG. 2 is a generalized block diagram illustrating the execution of a series of software applications within conventional computer system 100.

FIG. 2 illustrates a series of applications stored for execution in a computer system, such as system 100 of FIG. 1. The series includes a first application 210, a second application 220, and a third application 230, each of which represents a stage of a larger installation process for installing a software program. Applications 210, 220, 230 may be stored on a storage medium 130 or memory 120, as shown in FIG. 1. The execution of applications 210, 220, 230 is governed by an operating system 240, which is stored in memory 120.

In FIG. 2, applications 210, 220, 230 are to be executed in sequence, as controlled by operating system 240. FIG. 2 is drawn at a time when execution of first application 210 has begun, and at a time when first application 210 has created child processes 250, 260. In addition, child process 260 has spawned child processes of its own, or "grand-child" processes 270, 280.

In FIG. 2, the execution of first application 210 may terminate before child processes 250, 260, or grand-child processes 270, 280 have terminated. If the installation process does not wait for the executing child or grand-child processes to terminate, operating system 240 may initiate execution of second application 220, the next stage in installation. Execution of second application 220, or possibly some other application, while one or more child or grand-child processes of the first application 210 are still executing could cause corruption in the computer system in which the applications are used.

In Windows 95, the published Win32 API is supposed to delay the execution of other applications before child and processes of a parent application are terminated. Win32 API, however, often does not work correctly because Win32 API does not track the creation of grand-child processes of the parent application. Thus, using only Win32 API, the execution of other applications may commence before the child and, particularly, the grand-child processes of the parent have terminated. In sum, existing techniques fail to provide reliable tracking of the creation and destruction of child processes and grand-child processes during the execution of applications in a computer system.

SUMMARY

The present invention relates generally to monitoring the creation and destruction of child and grand-child processes within an application executing in a computer system controlled by an operating system. A child process has a corresponding child process database structure, and the executing application has a corresponding application process database structure. A list is provided for storing existing child process database structures corresponding to child processes existing within the executing application.

According to one aspect of the present invention, when a new process is created during execution of the application, a new process database structure corresponding to the new process is retrieved. Using the new process database structure, a parent process database structure corresponding to a parent process of the new process is retrieved. The parent process database structure is compared with the application process database structure. If the parent process database structure is the same as the application process database structure, the new process is identified as an existing child process. If the new process is identified as the existing child process, the new process database structure is added to the list of existing child process database structures.

According to another aspect of the present invention, monitoring the creation and destruction of child processes within the application includes determining when a process is terminated during execution of the application. A terminated process database structure corresponding to the terminated process is retrieved. The terminated process database structure is compared with the existing child process database structures in the list. If the terminated process database structure is the same as one of the existing child process database structures, the terminated process is identified as a terminated child process. If the terminated process is identified as the terminated child process, the terminated process database structure is removed from the list of existing child process database structures.

According to another aspect, the present invention may be situated in a virtual device driver, which may reside between the operating system and an executing application or process. The virtual device driver may be stored in a storage medium in the computer system. The VxD interfaces with both the operating system and the executing application.

According to yet another aspect of the present invention, the list is checked periodically to determine if the list has any entries. If the list has no entries, it is safe to assume that the existing child process and, possibly, related grand-child processes, have exited and execution of the application is complete. Other applications in a series of applications, for example, during the installation of a software program, may then be executed with minimal risk of corruption due to concurrent execution of applications in the series.

These and other aspects and advantages of the present invention will appear in the following detailed description in which exemplary embodiments of the invention have been set forth in conjunction with the drawings.

BRIEF DESCRIPTION

DETAILED DESCRIPTION

In the following detailed description, various embodiments of the device and method of the present invention for monitoring the creation and destruction of child processes within an executing application will be provided. Some embodiments of the present invention will identify practical applications, particularly of exemplary methods of the present invention, including a computer system and a computer-readable medium. Embodiments of the present invention are described in detail with reference to FIGS. 3–7.

Figure 3:
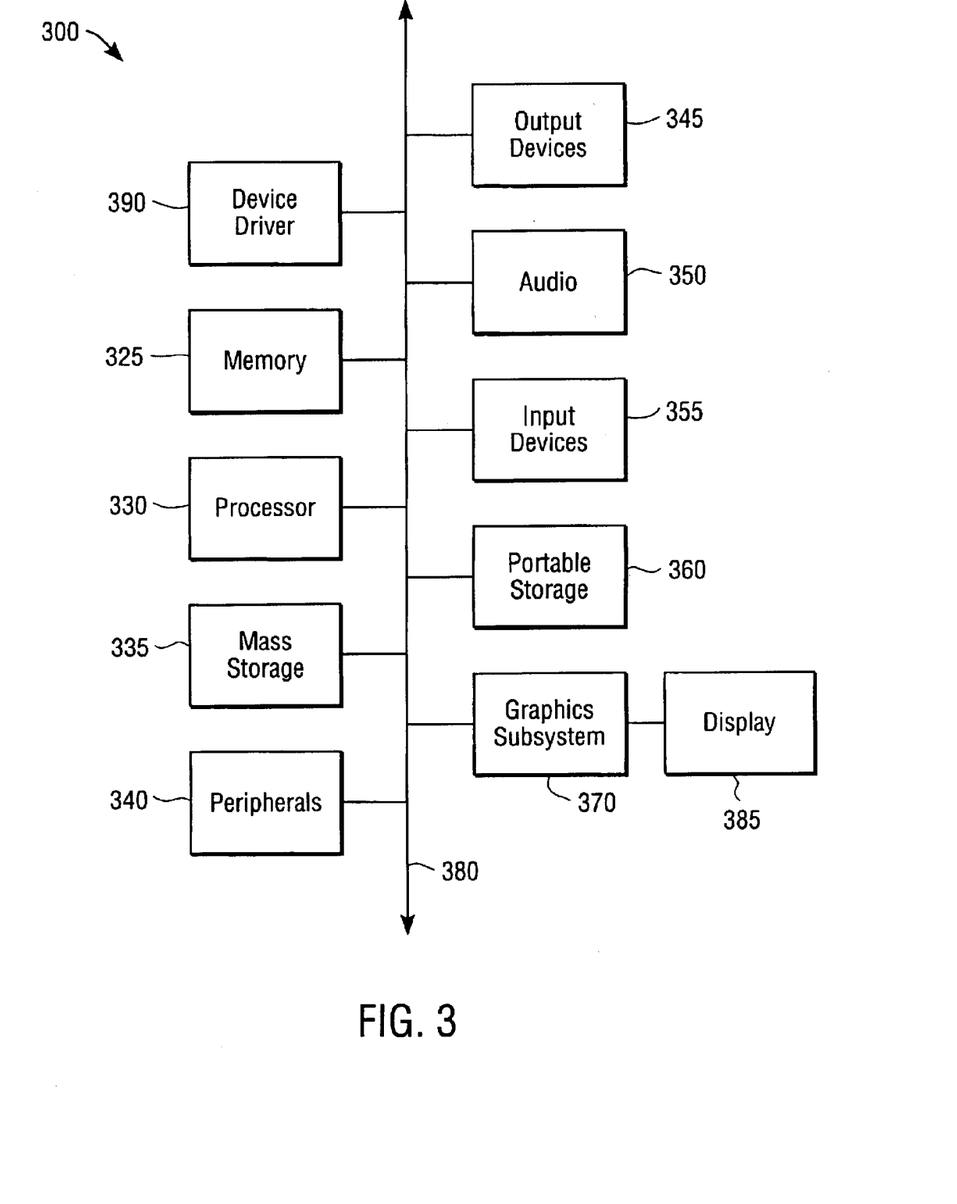
FIG. 3 is a generalized block diagram of a computer system 300 incorporating a device and method for monitoring the creation and destruction of child processes within an executing application, according to an exemplary embodiment of the present invention.

FIG. 3 is a block diagram of a computer system 300 incorporating a device and method for monitoring the creation and destruction of child processes within an executing application, according to an exemplary embodiment of the present invention. Computer system 300 of FIG. 3 includes a processor 330 and memory 325. Processor 330 may contain a single microprocessor, or may contain a plurality of microprocessors for configuring the computer system as a multi-processor system. Memory 325, stores, in part, instructions and data for execution by processor 330. If exemplary systems of the present invention are wholly or partially implemented in software, including a computer program, memory 325 stores the executable code when in operation. Memory 325 may include banks of dynamic random access memory (DRAM) as well as high speed cache memory.

The system of FIG. 3 further includes a mass storage device 335, peripheral device(s) 340, input device(s) 355, portable storage medium drive(s) 360, a graphics subsystem 370 and a display 385. For purposes of simplicity, the components shown in FIG. 3 are depicted as being connected via a single bus 380. However, the components may be connected through one or more data transport means. For example, processor 330 and memory 325 may be connected via a local microprocessor bus, and the mass storage device 335, peripheral device(s) 340, portable storage medium drive(s) 360, and graphics subsystem 370 may be connected via one or more input/output (I/O) buses.

Mass storage device 335, which is typically implemented with a magnetic disk drive or an optical disk drive, is a non-volatile storage device for storing data and instructions for use by processor 330. In another embodiment, mass storage device 335 stores a computer program which, when executed, implements an exemplary method of the present invention for purposes of loading such program to memory 325. An exemplary method of the present invention also may be stored in processor 330.

Portable storage medium drive 360 operates in conjunction with a portable non-volatile storage medium, such as a floppy disk, hard disk, or CD-ROM, and may include one or more machine-readable media including semiconductor memories (e.g., EEPROM), or other computer-readable medium, to input and output data and code to and from the computer system of FIG. 3. In one embodiment, an exemplary method of the present invention is stored on such a portable medium, and is input to the computer system 300 via the portable storage medium drive 360.

Peripheral device(s) 340 may include any type of computer support device, such as an input/output (I/O) interface, to add additional functionality to the computer system 300. For example, peripheral device(s) 340 may include a network interface card for interfacing computer system 300 to a network, a modem, and the like.

Input device(s) 355 provide a portion of a user interface. Input device(s) 355 may include an alpha-numeric keypad for inputting alpha-numeric and other key information, or a pointing device, such as a mouse, a trackball, stylus or cursor direction keys. Such devices provide additional means for interfacing with methods according to exemplary embodiments of the present invention.

In order to display textual and graphical information, the computer system 300 of FIG. 3 includes graphics subsystem 370 and display 385. Display 385 may include a cathode ray tube (CRT) display, liquid crystal display (LCD), other suitable display devices, or other means for displaying that enables a user to view the status of child processes as they are created and destroyed within an executing application. Graphics subsystem 370 receives textual and graphical information and processes the information for output to display 385. Display 385 can be used to display objects, component interfaces and/or display other information that is part of a user interface.

The system 300 of FIG. 3 also includes an audio system 350. In one embodiment, audio system 350 includes a sound card that receives audio signals from a microphone that may be found in peripherals 340.

Additionally, the system of FIG. 3 includes output devices 345. Examples of suitable output devices include speakers, printers, and the like.

The devices contained in the computer system of FIG. 3 are those typically found in general purpose computer systems, and are intended to represent a broad category of such computer components that are well known in the art. The system of FIG. 3 illustrates one platform which can be used for practically implementing methods according to exemplary embodiments of the present invention. Numerous other platforms will also suffice, such as Macintosh-based platforms available from Apple Computer, Inc., platforms with different bus configurations, networked platforms, multi-processor platforms, other personal computers, workstations, mainframes, navigation systems, and the like.

Computer system 300 may further include a different display means for the monitor, such as CRT display, LCD display, projection displays, or the like. Likewise, any type of memory may be used for memory 325. Other interface means, in addition to the component interfaces, may also be used including alpha-numeric keypads, other key information or any pointing devices such as a mouse, trackball, stylus, cursor or direction key.

The computer system 300 of FIG. 3 further includes a device driver 390, in which an exemplary virtual device driver ("VxD") constructed according to the present invention may be stored. Some operating systems, such as Windows 95, provide for the use of virtual device drivers, which are often used to improve software performance. A virtual device driver is typically a 32-bit, protected-mode driver that manages a system resource, such as a hardware device or installed software, so that more than one application can use the resource at the same time. The "x" in "VxD" represents the type of device driver. For example, a virtual device driver for a display device is known as a VDD, a virtual device driver for a timer device is a VTD, a virtual device driver for a printer device is a VPD, and so forth.

VxDs support hardware devices for a typical computer, including disk controllers, serial and parallel ports, keyboard and display devices, and so on. If the state of the hardware device can be the device generally has a corresponding virtual device and VxD. The VxD typically keeps track of the state of the device for each application and ensures that the device is in the correct state whenever an application continues.

Although most virtual devices manage hardware, some manage only installed software, such as an MS-DOS device driver. Such virtual devices contain code to emulate the software or ensure that the software uses data that applies only to the currently running application.

In FIG. 3, the VxD may be stored in memory 325, mass storage 335, or portable storage medium 360. The virtual device driver represents one embodiment of an exemplary method in accordance with the present invention, explained in greater detail below, and may be used with an operating system such as Windows 95 to monitor the creation and destruction of child processes during execution of an application.

Figure 4:
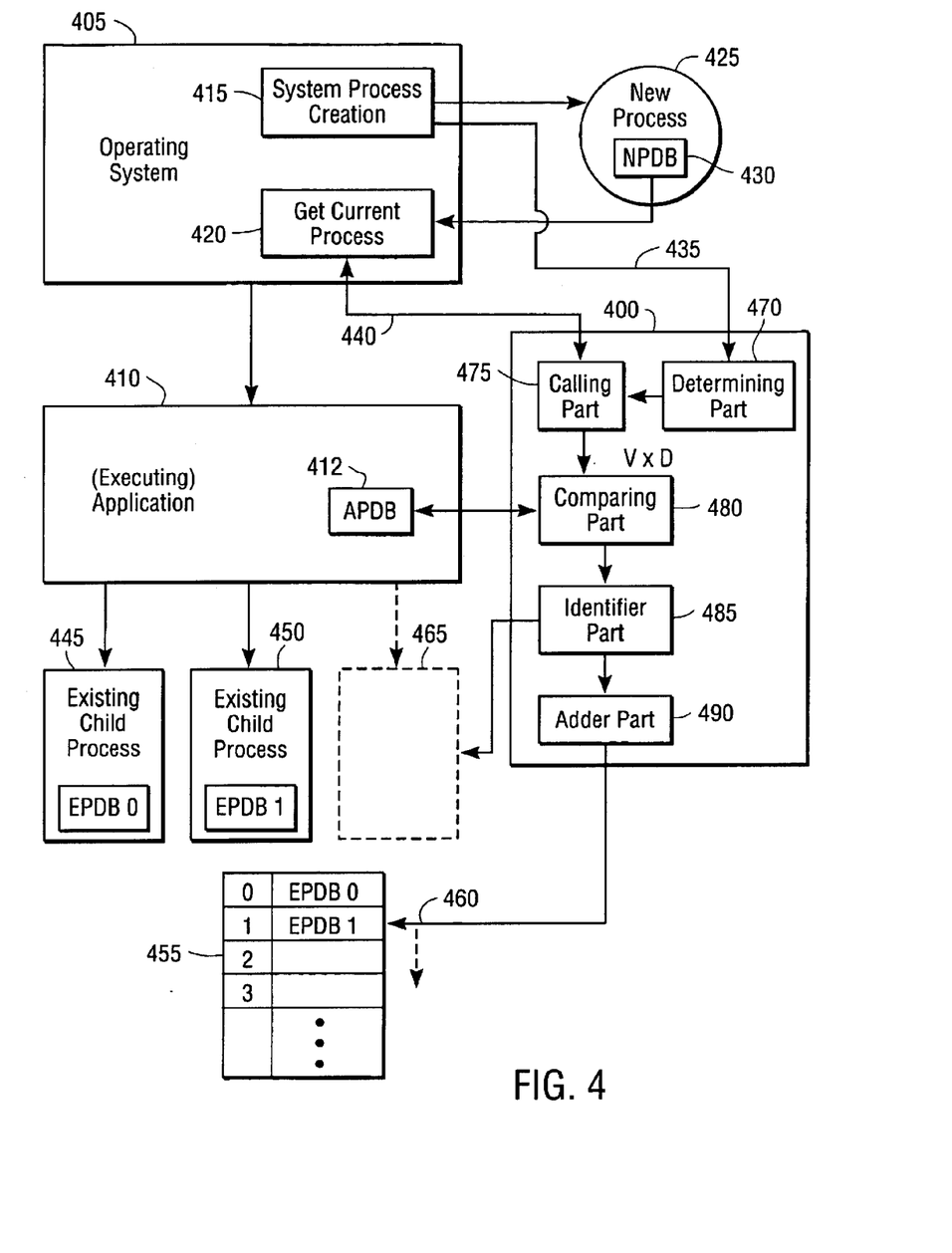
FIG. 4 is a generalized block diagram of a virtual device driver which monitors the creation of child processes within an executing application, according to an exemplary embodiment of the present invention.

FIG. 4 illustrates an exemplary virtual device driver 400 in accordance with the present invention. VxD 400 is configured to determine whether a new process 425 is an existing child process 465 of executing application 410. Thus, VxD 400 is in communication with executing application 410 and operating system 405, which is stored in mass storage device 335 or memory 325 of computer system 300 of FIG. 3. Operating system 405 controls the execution of application 410.

In FIG. 4, executing application 410 is shown as the parent process of existing child processes 445 and 450. Executing application 410 may be controlled directly by operating system 405, or it may be the child or grand-child process created by one or more parent processes executing under the control of operating system 405. Thus, for example, if executing application 410 is the child process of another parent process (not shown), existing child processes 445 and 450 would be grand-child processes of that parent process. In this way, VxD 400 is configured to monitor the creation and destruction of both child processes and grand-child processes.

In FIG. 4, application 410 has a corresponding application database structure ("APDB") 412 identifying the particular application 410. APDB 412 includes process identifiers which identify, respectively, application 410, any child processes of application 410, and any grand-child processes of application 410. For example, the following code represents an exemplary APDB used in a Windows 95 or Windows NT operating system:

typedef struct PDB
DWORD Type;
DWORD cReference;
DWORD un1;
DWORD pSomeEvent;
DWORD TerminationStatus;
DWORD un2;
DWORD DefaultHeap;
DWORD MemoryContext;

```
DWORD flags;
DWORD pPSP;
WORD PSPSelector;
WORD MTEIndex;
WORD cThreads;
WORD cNotTermThreads;
WORD un3;
WORD cRing0Threads;
DWORD HeapHandle;
DWORD W16TDB;
DWORD MemMapFiles;
PENVIRONMENT_DB pEDB;
DWORD pHandleTable;
struct PDB *ParentPDB;
DWORD MODREFlist;
DWORD ThreadList;
DWORD DebuggeeCB;
DWORD LocalHeapFreeHead;
DWORD InitialRingOID;
DWORD crst[41;
DWORD un4[3];
DWORD pConsole;
DWORD tlsInUseBits1;
DWORD tlsInUseBits2;
DWORD ProcessDWORD;
struct PDB *ProcessGrou
DWORD pExeMODREF;
DWORD TopExcFilter;
DWORD BasePriority;
DWORD HeapOwnList;
DWORD HeapHandleBlockLis
DWORD pSomeHeapPtr;
DWORD pConsoleProvider;
WORD EnvironSelector;
WORD ErrorMode;
DWORD pevtLoadFinished;
WORD UTState;
}PDB, *PPDB;
```

In FIG. 4, operating system 405 includes a system process creation function 415 which controls the creation of new processes in the computer system 300. System process creation function 415 creates new process 425, having a corresponding new process database structure ("NPDB") 430, during execution of application 410. New process database structure 430 may include process identifiers which identify, respectively new process 425 and the parent process of new process 425.

In FIG. 4, upon creating new process 425, system process creation function 415 outputs a signal on line 435. In one example, where operating system 405 is Windows 95, this signal is a Create_Thread signal or Thread_Init signal.

In FIG. 4, operating system 405 further includes a get current process function 420. In the example where operating system 405 is Windows 95, function 420 is the VWIN32_GetCurrentProcessHandle function provided by the Windows 95 operating system. When called by calling part 475, get current process function 420 relays new process database structure 430 to VxD 400 over line 440.

In FIG. 4, application 410 has begun executing, and has spawned child processes, including child process 445 and child process 450. These processes 445 and 450 are considered "existing," as they have not yet terminated or otherwise been identified as terminated child processes of executing application 410. Existing child processes 445 and 450 have corresponding existing child process databases ("EPDBs"), respectively, illustrated in FIG. 4 as EPDB 0 and EPDB 1. Each existing child process database structure preferably includes process identifiers which identify itself, its parent process, and grand-parent processes or applications, if any.

In FIG. 4, a list 455 is provided for storing existing child process database structures corresponding to child processes existing within the executing application. As shown in FIG. 4, EPDB 0 and EPDB 1, corresponding to existing child processes 445 and 450, have already been added to list 455 in sequence, using methods described in greater detail below. List 455 may be realized in software or hardware, depending on the desired implementation. For example, in FIG. 3, list 455 may be implemented using a buffer in computer system 300, and maintained in memory 325 or mass storage 335. List 455 is shown in FIG. 4 as having at least 4 entries (entries 0 through 3), and may have any number of entries as desired for the particular application of the program.

In FIG. 4, a pointer 460 is provided to identify one of the existing child process database structures in list 455, preferably the EPDB most recently added to the list. In FIG. 4, EPDB 1 was added to list 455 after EPDB 0, so pointer 460 points to EPDB 1. Pointer 460 is preferably embodied in a counter, which may be implemented in hardware or software of computer system 300. Pointer 460 is moveable to point to any one of various entries in list 455, as described in greater detail below.

In FIG. 4, VxD 400 is configured to monitor the creation of new process 425 and determine if new process 425 may be classified in block 465 as an existing child process of executing application 410. To this end, VxD 400 includes parts which perform the specific operations set forth in flow diagram 500 of FIG. 5.

Figure 5:
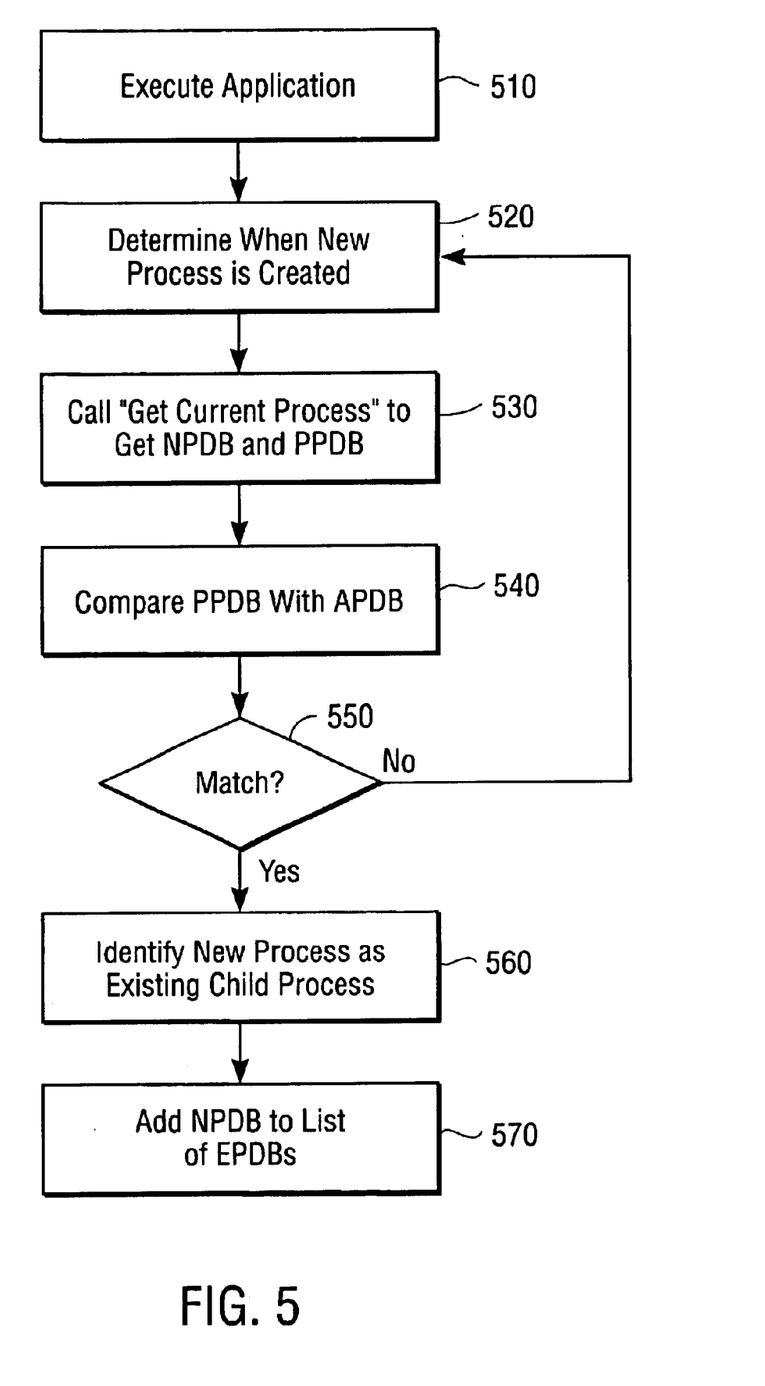
FIG. 5 is a flow diagram of a method for monitoring the creation of child processes within an executing application, in accordance with an exemplary embodiment of the present invention.

In FIGS. 4 and 5, execution of application 410 begins in step 510. VxD 400 includes a determining part 470, which determines when new process 425 is created, in step 520. As shown in FIG. 4, determining part 470 communicates with system process creation function 415 to receive signals over line 435 that indicate that new process 425 has been created. Thus, in the example where operating system 405 is Windows 95, determining part 470 of VxD 400 receives the Create_Thread signal or Thread_Init signal over line 435 when new process 425 is created. Other various messages and signals may be passed to determining part 470 to notify VxD 400 of a thread's creation, as should be appreciated by those skilled in the art.

In FIG. 5, after determining in step 520 that new process 425 has been created, in step 530, VxD 400 calls "get current process" function 420 to get new process database structure 430 corresponding to new process 425, over line 440. As shown in FIG. 4, operation 530 is carried out by calling part 475, which communicates with get current process function 420 over line 440. In the example where operating system 405 is Windows 95, calling part 475 makes a call to the function VWIN32_GetCurrentProcessHandle to get the current process handle or database structure corresponding to new process 425, that is, NPDB 430.

In FIGS. 4 and 5, NPDB 430 is passed to calling part 475 in step 530, when get current process function 420 is called. Within NPDB 430, a parent process identifier is included which identifies the parent process of new process 425. In this way, VxD 400 can use the parent process identifier to retrieve the parent process database structure (PPDB) of the parent process of new process 425. For example, in one embodiment, a pointer is passed with NPDB 430 which may then be used by VxD 400 to retrieve the PPDB from operating system 405.

As shown in FIGS. 4 and 5, virtual device driver 400 further includes a comparing part 480, which communicates with calling part 475 and executing application 410. Comparing part 480 receives the PPDB from calling part 475, and then compares the PPDB with the APDB 412 corresponding to application 410, in step 540. In this way, VxD 400 determines if thread 425 is a child process of executing application 410. If more than one application is being executed, the PPDB is compared with the application database structures of the various applications.

In step 550 of FIG. 5, if comparing part 480 determines that there is no identity between the PPDB corresponding to the parent of new process 425 and APDB 412, the VxD recognizes that new process 425 is not a child process of executing application 410, and VxD disregards new process 425. The flow then returns to step 520. On the other hand, if the PPDB matches APDB 412, in step 550, the flow progresses to step 560. In step 560, an identifier part 485 of VxD 400 identifies new process 425 as an existing child process in block 465. This positive identification is then communicated to an adder part 490 of VxD 400.

In FIGS. 4 and 5, following step 560, in step 570, adder part 490 retrieves NPDB 430 from determining part 470 and adds NPDB 430 to the list 455 of existing child process database structures, in entry "2." After adding NPDB 430 to list 455, pointer 460 is moved to point to NPDB 430 in entry "2." In the example where pointer 460 is maintained using a counter, the counter is incremented by "1." The method of FIG. 5 then returns, from step 570, to step 520 to determine when the next new process is created during execution of application 410.

Figure 6:
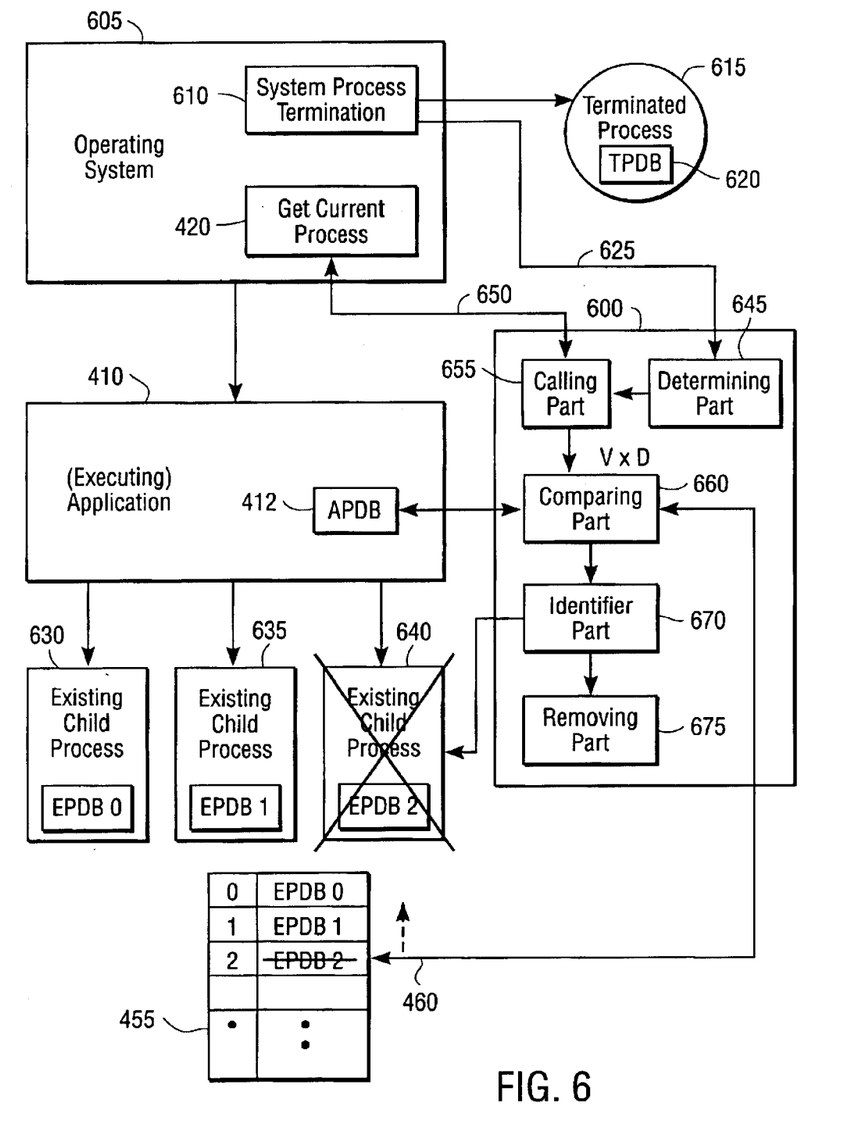
FIG. 6 is a generalized block diagram of a virtual device driver which monitors the destruction of child processes within an executing application, according to an exemplary embodiment of the present invention.
Figure 7:
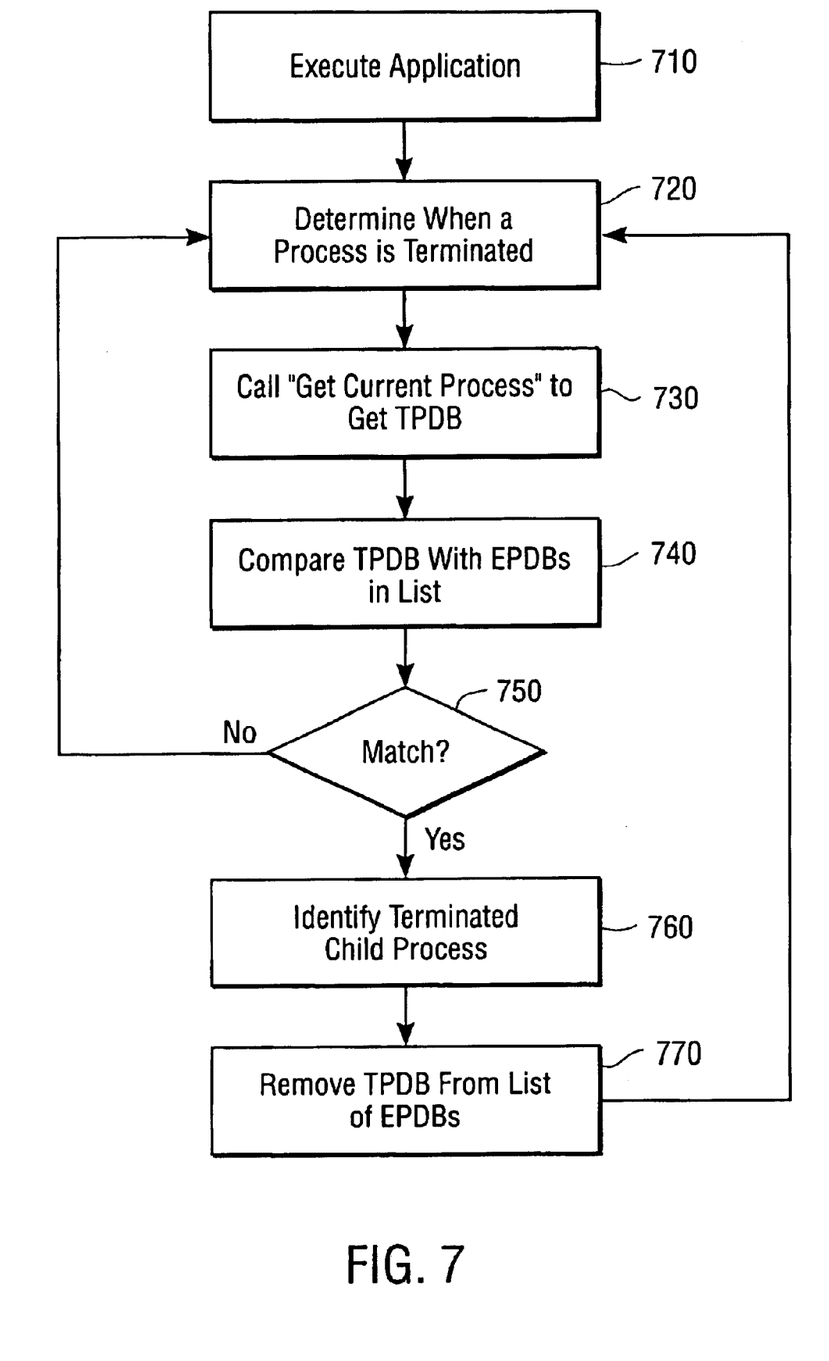
FIG. 7 is a flow diagram of a method for monitoring the destruction of child processes within an executing application, in accordance with an exemplary embodiment of the present invention.

Exemplary virtual device drivers according to embodiments of the present invention are also capable of monitoring the destruction of threads within an executing application, as shown in FIGS. 6 and 7. An exemplary virtual device driver 600 has parts similar to those of VxD 400, and also includes parts configured to monitor the destruction of child processes and grand-child processes within executing application 410, described in greater detail below.

In FIG. 6, an operating system 605, stored in mass storage device 335 or memory 325 of computer system 300 of FIG. 3, shares the features of operating system 405 in FIG. 4. For example, operating system 605 similarly controls the execution of application 410, and includes get current process function 420. In addition, operating system 605 includes a system process termination function 610 which controls the termination of processes while application 410 executes in computer system 300. In FIG. 6, system process termination function 610 terminates a process 615, having a corresponding terminated process database structure ("TPDB") 620, during execution of application 410. TPDB 620 preferably includes process identifiers similar to NPDB 430 of FIG. 4.

Upon the termination of process 615, system process termination function 610 outputs a signal on line 625. In one example, where operating system 605 is Windows 95, this signal is a Terminate_Thread signal. Using Windows 95, other message signals may be output to line 625 by system process termination function 610 to indicate the destruction of a thread, including Thread_Not_Executable and Destroy_Thread message signals. Various other similar message signals may be output to line 625 to notify VxD 600 of a thread's destruction, as should be appreciated by those skilled in the art.

In FIG. 6, application 410 has begun executing, and has spawned existing child processes 630, 635, and 640. Existing child processes 630–640 each have corresponding EPDBs, namely EPDB 0, EPDB 1, and EPDB2, as shown in FIG. 6. EPDBs 0–2 have been added to list 455 in sequence, using methods described above with respect to FIGS. 4 and 5.

In FIG. 6, VxD 600 is not only configured to monitor the creation of child processes during execution of application 410, similar to VxD 400 of FIG. 4, but also configured to monitor the termination of process 615 and determine if terminated process 615 is any of one of existing child processes 630–640. To perform this monitoring, VxD 400 includes parts which perform the specific operations set forth in flow diagram 700 of FIG. 7.

In FIGS. 6 and 7, execution of application 410 begins in step 710. VxD 600 includes a determining part 645 which determines when process 615 is terminated, in step 720. Determining part 645 communicates with system process termination function 610 to receive signals over line 625 indicating that process 615 has been terminated. In the example where operating system 405 is Windows 95, determining part 645 monitors line 625 for the Terminate_Thread message signal, or the Thread_Not_Executable or Destroy_Thread message signals. By monitoring line 625, for any of these signals, VxD 600 is notified when a thread, such as process 615, is terminated.

In FIG. 7, after determining in step 720 that process 615 has been terminated, in step 730, VxD 600 calls "get current process" function 420 to get terminated process database structure 620 corresponding to terminated process 615, over a line 650, using calling part 655. In the example where operating system 605 is Windows 95, calling part 655 makes a call to the function VWIN32_GetCurrentProcessHandle to get TPDB 620 as the current process handle or database structure corresponding to terminated process 615.

As shown in FIGS. 6 and 7, virtual device driver 600 further includes a comparing part 660 which communicates with calling part 655 to receive TPDB 620, and then compares TPDB 620 with the existing child process database structures EPDB 0–2 stored in list 455, in step 740.

In step 750 of FIGS. 6 and 7, if comparing part 660 determines there is no match between TPDB 620 and any of the existing process database structures EPDB 0–2 stored in list 455, VxD 600 recognizes that terminated process 615 is not one of existing child processes 630–640, and the flow returns to step 720. In step 760, if comparing part 660 determines that TPDB 620 is the same as any of EPDBs 0–2 stored in list 455, an identifier part 670 identifies terminated process 615 as a terminated child process. For example, in FIG. 6, comparing part 660 determines that TPDB 620 is the same as EPDB 2 stored in list 455, so identifier part 670 identifies terminated process 615 as a terminated child process, namely child process 640.

In FIGS. 6 and 7, the flow progresses from step 760 to step 770, in which a removing part 675 situated within VxD 600 removes TPDB 620 from list 455 of existing child process database structures EPDB 0–2. Thus, in FIG. 6, since EPDB 2 matches TPDB 620, EPDB 2 is removed from list 455. In other examples, where one or more other EPDBs stored in list 455 match TPDB 620, such EPDBs are also removed from list 455. After EPDBs are removed from list 455, pointer 460 is moved to point a remaining existing child process database structure most recently added to list 455. Thus, in Fig. 2, after EPDB2 is removed from list 455, pointer 460 is moved back by one entry to point to entry "1," EPDB 1. In another example, where EPDB0 is removed from the list, EPDB1 is moved to entry "0," EPDB2 is moved to entry "1," and pointer 460 is moved back by one entry to point to EPDB2 in entry "1." If pointer 460 is realized using a counter, the counter is decremented by "1" or, in other examples, by the number of entries removed from list 455. The method of FIG. 7 then returns, from step 770, to step 720 to determine when another process is destroyed during execution of application 410.

According to exemplary embodiments of the present invention, if a child process is spawned by an executing application, the child process database structure corresponding to the child process is added to the list 455 of monitored processes. When the child process is terminated, the child process database structure is removed from list 455.

Thus, exemplary embodiments of the present invention also provide for controlling the execution of a series of applications or processes in a computer system. For example, the installation process of a software program often includes the execution of a series of installation applications contained therein. To avoid corruption in the computer system, it is often desirable to execute these installation applications in sequence, such that no two installation applications are executing concurrently.

When one of the applications in a series is executing, an exemplary VxD, such as VxD 400 or 600, periodically determines whether list 455 has any entries. In this way, if list 455 contains no existing child process database structures, the VxD recognizes that the existing child process and, possibly, related grandchild processes, have exited and the execution of the application is complete. Thus, the VxD may then signal the operating system to execute the next application in the sequence, for example, the next step in the installation process.

In another exemplary embodiment, the operating system or program that started the execution of the application being monitored calls the VxD to determine if the list is empty. In the example where list 455 is embodied in a counter, the VxD determines whether the counter equals zero. The operating system may call the VxD in this fashion periodically, for example, every 5 seconds or so. If the counter does not equal zero, then the periodic calling desirably continues. Otherwise, it is safe to assume that the monitored application and the children thereof have terminated, and the next program in the series may be executed or installed.

It should be understood that the particular embodiments described above are only illustrative of the principles of the present invention, and various modifications could be made by those skilled in the art without departing from the scope and spirit of the invention. Thus, the scope of the present invention is limited only to the extent of the claims that follow.

What is claimed is:

1. A method for monitoring the creation and destruction of child processes within an application executing in a computer system controlled by an operating system, each child process having a corresponding child process database structure, the executing application having a corresponding application process database structure, the method comprising:

providing a list for storing existing child process database structures corresponding to child processes existing within the executing application;

determining when a new process is created during execution of the application;

retrieving a new process database structure corresponding to the new process;

retrieving, using the new process database structure, a parent process database structure corresponding to a parent process of the new process;

comparing the parent process database structure with the application process database structure;

identifying, if the parent process database structure is the same as the application process database structure, the new process as an existing child process; and adding, if the new process is identified as the existing child process, the new process database structure to the list of existing child process database structures.

2. The method of claim 1 further comprising:

determining when a process is terminated during execution of the application;

retrieving a terminated process database structure corresponding to the terminated process;

comparing the terminated process database structure with the existing child process database structures in the list;

identifying, if the terminated process database structure is the same as one of the existing child process database structures, the terminated process as a terminated child process; and removing, if the terminated process is identified as the terminated child process, the terminated process database structure from the list of existing child process database structures.

3. The method of claim 1 wherein the list of existing child process database structures is maintained in a buffer in the computer system, the method further comprising:

providing a pointer which points to one of the existing child process database structures in the list; and after adding the new process database structure to the list, moving the pointer to point to the new process database structure.

4. The method of claim 2 wherein the list of existing child process database structures is maintained in a buffer in the computer system, the method further comprising:

providing a pointer which points to one of the existing child process database structures in the list;

after adding the new process database structure to the list, moving the pointer to point to the new process database structure; and after removing the terminated process database structure from the list, moving the pointer to point to one of the existing child process database structures most recently added to the list.

5. The method of claim 4 wherein the pointer is maintained in a counter in the computer system, and wherein:

moving the pointer to point to the new process database structure includes incrementing the counter; and moving the pointer to point to the existing child process most recently added to the list includes decrementing the counter.

6. The method of claim 2 wherein the executing application is one of a series of applications stored within the computer system for execution, the method further comprising:

periodically determining whether the list includes any existing child process database structures; and executing, if the list includes no existing child process database structures, a next application in the series of applications.

7. The method of claim 5 wherein the executing application is one of a series of applications stored within the computer system for execution, the method further comprising:
   periodically determining whether the counter has a value of zero; and
   executing, if the counter has a value of zero, a next application in the series of applications.

8. The method of claim 6 wherein the series of applications is at least a portion of an installation program.

9. The method of claim 1 wherein the operating system is a Windows operating system having a system process creation function for creating the new process and thereupon providing a Create_Thread signal, the operating system further having a Get_Current_Process_Handle function for providing the new process database structure.

10. The method of claim 9 wherein determining when the new process is created includes receiving the Create_Thread signal.

11. The method of claim 9 wherein retrieving the new process database structure includes calling the Get_Current_Process_Handle function.

12. The method of claim 9 wherein retrieving the parent process database structure includes using a pointer in the new process database structure which identifies the parent process database structure.

13. The method of claim 2 wherein the operating system is a Windows operating system having a system process creation function for creating the new process and thereupon providing a Create_Thread signal, and a system process termination function for terminating the process and thereupon providing a Terminate_Thread signal, and a Get_Current_Process_Handle function for providing the terminated process database structure.

14. The method of claim 13 wherein determining when the process is terminated includes receiving the Terminate_Thread signal.

15. The method of claim 13 wherein retrieving the terminated process database structure includes calling the Get_Current_Process_Handle function.

16. A method for monitoring the creation and destruction of child processes within an application executing in a computer system controlled by a Windows operating system, each child process having a corresponding child process database structure, the executing application having a corresponding application process database structure, the Windows operating system having a system process creation function for creating a new process and thereupon providing a Create_Thread signal, the operating system further having a Get_Current_Process_Handle function for providing, when called a new process database structure corresponding to the new process, the method comprising:
   providing a list for storing existing child process database structures corresponding to child processes existing within the executing application;
   determining, upon receiving the Create_Thread signal, that the new process has been created;
   calling, after determining that the new process has been created, the Get_Current_Proccess_Handle function to retrieve the new process database structure;
   identifying, using a pointer in the new process database structure, a parent process database structure corresponding to a parent process of the new process;
   comparing the parent process database structure with the application process database structure;
   identifying, if the parent process database structure is the same as the application process database structure, the new process as an existing child process; and
   adding, if the new process is identified as the existing child process, the new process database structure to the list of existing child process database structures.

17. The method of claim 16, the operating system further having a system process termination function for terminating a process and thereupon providing a Terminate_Thread signal, wherein the Get_Current_Process_Handle function further provides, when called, a terminated process database structure corresponding to the terminated process, the method further comprising:
   determining, upon receiving the Terminate Thread signal, that the process has been terminated;
   calling, after determining that the process has been terminated, the Get_Current_Proccess Handle function to retrieve the terminated process database structure;
   comparing the terminated process database structure with the existing child process database structures in the list;
   identifying, if the terminated process database structure is the same as one of the existing child process database structures, the terminated process as a terminated child process; and
   removing, if the terminated process is identified as the terminated child process, the terminated process database structure from the list of existing child process database structures.

18. A virtual device driver situated in a storage medium of a computer system for monitoring the creation and destruction of child processes within an application executing in the computer system controlled by an operating system, each child process having a corresponding child process database structure, the executing application having a corresponding application process database structure, a list provided for storing existing child process database structures corresponding to child processes existing within the executing application, the virtual device driver comprising:
   a determining part which determines when a new process is created during execution of the application;
   a calling part which:
      (i) retrieves a new process database structure corresponding to the new process, and
      (ii) retrieves, using the new process database structure, a parent process database structure corresponding to a parent process of the new process;
   a comparing part which compares the parent process database structure with the application process database structure;
   an identifier part which identifies, if the parent process database structure is the same as the application process database structure, the new process as an existing child process; and
   an adding part which adds, if the new process is identified as the existing child process, the new process database structure to the list of existing child process database structures.

19. The virtual device driver of claim 18 further comprising:
   a determining part which determines when a process is terminated during execution of the application;
   a calling part which retrieves a terminated process database structure corresponding to the terminated process;
   a comparing part which compares the terminated process database structure with the existing child process database structures in the list;
   an identifier part which identifies, if the terminated process database structure is the same as one of the existing child process database structures, the terminated process as a terminated child process; and a removing part which removes, if the terminated process is identified as the terminated child process, the terminated process database structure from the list of existing child process database structures.

20. The virtual device driver of claim 18 wherein the operating system is a Windows operating system having a system process creation function for creating the new process and thereupon providing a Create_Thread signal, the operating system further having a Get_Current_Process_Handle function for providing the new process database structure.

21. The virtual device driver of claim 20 wherein the determining part is in communication with the system process creation function and determines when the new process is created by receiving the Create_Thread signal.

22. The virtual device driver of claim 20 wherein the calling part is in communication with the Get_Current_Process_Handle function and retrieves the new process database structure by calling the Get_Current_Process_Handle function.

23. The virtual device driver of claim 19 wherein the operating system is a Windows operating system having a system process creation function for creating the new process and thereupon providing a Create_Thread signal, and a system process termination function for terminating the process and thereupon providing a Terminate_Thread signal, and a Get_Current_Process_Handle function for providing the terminated process database structure.

24. The virtual device driver of claim 23 wherein the determining part is in communication with the system process termination function and determines when the process is terminated by receiving the Terminate_Thread signal.

25. The virtual device driver of claim 23 wherein the calling part is in communication with the Get_Current_Process_Handle function and retrieves the terminated process database structure by calling the Get_Current_Process_Handle function.

26. A virtual device driver situated in a storage medium of a computer system for monitoring the creation and destruction of child processes within an application executing in the computer system controlled by a Windows operating system, each child process having a corresponding child process database structure, the executing application having a corresponding application process database structure, the Windows operating system having a system process creation function for creating a new process and thereupon providing a Create_Thread signal, the operating system further having a Get_Current_Process_Handle function for providing, when called a new process database structure corresponding to the new process, a list provided in the computer system for storing existing child process database structures corresponding to child processes existing within the executing application, the virtual device driver comprising:

a determining part in communication with the system process creation function which determines, upon receiving the Create_Thread signal, that the new process has been created;

a calling part which:
(i) calls the Get_Current_Proccess_Handle function to retrieve the new process database structure, and
(ii) retrieves, using a pointer in the new process database structure, a parent process database structure corresponding to a parent process of the new process;

a comparing part which compares the parent process database structure with the application process database structure;

an identifier part which identifies, if the parent process database structure is the same as the application process database structure, the new process as an existing child process; and an adder part which adds, if the new process is identified as the existing child process, the new process database structure to the list of existing child process database structures.

27. The virtual device driver of claim 26, the operating system further having a system process termination function for terminating a process and thereupon providing a Terminate_Thread signal, wherein the Get_Current_Process_Handle function further provides, when called, a terminated process database structure corresponding to the terminated process, the virtual device driver further comprising:

a determining part which determines, upon receiving the Terminate_Thread signal, that the process has been terminated;

a calling part which calls the Get_Current_Proccess Handle function to retrieve the terminated process database structure;

a comparing part which compares the terminated process database structure with the existing child process database structures in the list;

an identifier part which identifies, if the terminated process database structure is the same as one of the existing child process database structures, the terminated process as a terminated child process; and a removing part which removes, if the terminated process is identified as the terminated child process, the terminated process database structure from the list of existing child process database structures.

28. A processor readable storage medium having processor readable code embodied on the processor readable storage medium, the processor readable code for programming a processor to perform a method of monitoring the creation and destruction of child processes within an application executing in a computer system controlled by an operating system, each child process having a corresponding child process database structure, the executing application having a corresponding application process database structure, the method comprising:

providing a list for storing existing child process database structures corresponding to child processes existing within the executing application;

determining when a new process is created during execution of the application;

retrieving a new process database structure corresponding to the new process;

retrieving, using the new process database structure, a parent process database structure corresponding to a parent process of the new process;

comparing the parent process database structure with the application process database structure;

identifying, if the parent process database structure is the same as the application process database structure, the new process as an existing child process; and adding, if the new process is identified as the existing child process, the new process database structure to the list of existing child process database structures.

29. The processor readable storage medium of claim 28, the method further comprising:

determining when a process is terminated during execution of the application;

retrieving a terminated process database structure corresponding to the terminated process;

comparing the terminated process database structure with the existing child process database structures in the list;

identifying, if the terminated process database structure is the same as one of the existing child process database structures, the terminated process as a terminated child process; and removing, if the terminated process is identified as the terminated child process, the terminated process database structure from the list of existing child process database structures.

30. The processor readable storage medium of claim 28 wherein the list of existing child process database structures is maintained in a buffer in the computer system, the method further comprising:

providing a pointer which points to one of the existing child process database structures in the list; and after adding the new process database structure to the list, moving the pointer to point to the new process database structure.

31. The processor readable storage medium of claim 28 wherein the list of existing child process database structures is maintained in a buffer in the computer system, the method further comprising:

providing a pointer which points to one of the existing child process database structures in the list;

after adding the new process database structure to the list, moving the pointer to point to the new process database structure; and after removing the terminated process database structure from the list, moving the pointer to point to one of the existing child process database structures most recently added to the list.

32. The processor readable storage medium of claim 28 wherein the pointer is maintained in a counter in the computer system, and wherein:

moving the pointer to point to the new process database structure includes incrementing the counter; and moving the pointer to point to the existing child process most recently added to the list includes decrementing the counter.

33. The processor readable storage medium of claim 28 wherein the executing application is one of a series of applications stored within the computer system for execution, the method further comprising:

periodically determining whether the list includes any existing child process database structures; and executing, if the list includes no existing child process database structures, a next application in the series of applications.

34. The processor readable storage medium of claim 28 wherein the executing application is one of a series of applications stored within the computer system for execution, the method further comprising:

periodically determining whether the counter has a value of zero; and executing, if the counter has a value of zero, a next application in the series of applications.

35. The processor readable storage medium of claim 34 wherein the series of applications is at least a portion of an installation program.

36. The processor readable storage medium of claim 28 wherein the operating system is a Windows operating system having a system process creation function for creating the new process and thereupon providing a Create_Thread signal, the operating system further having a Get_Current_Process_Handle function for providing the new process database structure.

37. The processor readable storage medium of claim 28 wherein determining when the new process is created includes receiving the Create_Thread signal.

38. The processor readable storage medium of claim 28 wherein retrieving the new process database structure includes calling the Get_Current_Process_Handle function.

39. The processor readable storage medium of claim 28 wherein retrieving the parent process database structure includes using a pointer in the new process database structure which identifies the parent process database structure.

40. The processor readable storage medium of claim 30 wherein the operating system is a Windows operating system having a system process creation function for creating the new process and thereupon providing a Create_Thread signal, and a system process termination function for terminating the process and thereupon providing a Terminate_Thread signal, and a Get_Current_Process_Handle function for providing the terminated process database structure.

41. The processor readable storage medium of claim 40 wherein determining when the process is terminated includes receiving the Terminate_Thread signal.

42. The processor readable storage medium of claim 40 wherein retrieving the terminated process database structure includes calling the Get_Current_Process_Handle function.

43. A processor readable storage medium having processor readable code embodied on the processor readable storage medium, the processor readable code for programming a processor to perform a method for monitoring the creation and destruction of child processes within an application executing in a computer system controlled by a Windows operating system, each child process having a corresponding child process database structure, the executing application having a corresponding application process database structure, the Windows operating system having a system process creation function for creating a new process and thereupon providing a Create_Thread signal, the operating system further having a Get_Current_Process_Handle function for providing, when called a new process database structure corresponding to the new process, the method comprising:

providing a list for storing existing child process database structures corresponding to child processes existing within the executing application;

determining, upon receiving the Create_Thread signal, that the new process has been created;

calling, after determining that the new process has been created, the Get_Current_Proccess_Handle function to retrieve the new process database structure;

identifying, using a pointer in the new process database structure, a parent process database structure corresponding to a parent process of the new process;

comparing the parent process database structure with the application process database structure;

identifying, if the parent process database structure is the same as the application process database structure, the new process as an existing child process; and adding, if the new process is identified as the existing child process, the new process database structure to the list of existing child process database structures.

44. The processor readable storage medium of claim 43, the operating system further having a system process termination function for terminating a process and thereupon providing a Terminate_Thread signal, wherein the Get_Current_Process_Handle function further provides, when called, a terminated process database structure corresponding to the terminated process, the method further comprising:

determining, upon receiving the Terminate_Thread signal, that the process has been terminated;

calling, after determining that the process has been terminated, the Get_Current_Proccess Handle function to retrieve the terminated process database structure;

comparing the terminated process database structure with the existing child process database structures in the list;

identifying, if the terminated process database structure is the same as one of the existing child process database structures, the terminated process as a terminated child process; and removing, if the terminated process is identified as the terminated child process, the terminated process database structure from the list of existing child process database structures.

45. A virtual device driver situated in a storage medium of a computer system for monitoring the creation and destruction of child processes within an application executing in the computer system controlled by an operating system, each child process having a corresponding child process database structure, the executing application having a corresponding application process database structure, a list provided for storing existing child process database structures corresponding to child processes existing within the executing application, the virtual device driver comprising:

determining means for determining when a new process is created during execution of the application;

calling means for:
 (i) retrieving a new process database structure corresponding to the new process, and
 (ii) retrieving, using the new process database structure, a parent process database structure corresponding to a parent process of the new process;

comparing means for comparing the parent process database structure with the application process database structure;

identifier means for identifying, if the parent process database structure is the same as the application process database structure, the new process as an existing child process; and adding means for adding, if the new process is identified as the existing child process, the new process database structure to the list of existing child process database structures.

46. The virtual device driver of claim 45 further comprising:

determining means for determining when a process is terminated during execution of the application;

calling means for retrieving a terminated process database structure corresponding to the terminated process;

comparing means for comparing the terminated process database structure with the existing child process database structures in the list;

identifier means for identifying, if the terminated process database structure is the same as one of the existing child process database structures, the terminated process as a terminated child process; and removing means for removing, if the terminated process is identified as the terminated child process, the terminated process database structure from the list of existing child process database structures.

47. The virtual device driver of claim 45 wherein the operating system is a Windows operating system having a system process creation function for creating the new process and thereupon providing a Create_Thread signal, the operating system further having a Get_Current_Process_Handle function for providing the new process database structure.

48. The virtual device driver of claim 47 wherein the determining means is in communication with the system process creation function and determines when the new process is created by receiving the Create_Thread signal.

49. The virtual device driver of claim 47 wherein the calling means is in communication with the Get_Current_Process_Handle function and retrieves the new process database structure by calling the Get_Current_Process_Handle function.

50. The virtual device driver of claim 46 wherein the operating system is a Windows operating system having a system process creation function for creating the new process and thereupon providing a Create_Thread signal, and a system process termination function for terminating the process and thereupon providing a Terminate_Thread signal, and a Get_Current_Process_Handle function for providing the terminated process database structure.

51. The virtual device driver of claim 50 wherein the determining means is in communication with the system process termination function and determines when the process is terminated by receiving the Terminate_Thread signal.

52. The virtual device driver of claim 50 wherein the calling means is in communication with the Get_Current_Process_Handle function and retrieves the terminated process database structure by calling the Get_Current_Process_Handle function.

53. A virtual device driver situated in a storage medium of a computer system for monitoring the creation and destruction of child processes within an application executing in the computer system controlled by a Windows operating system, each child process having a corresponding child process database structure, the executing application having a corresponding application process database structure, the Windows operating system having a system process creation function for creating a new process and thereupon providing a Create_Thread signal, the operating system further having a Get_Current_Process_Handle function for providing, when called a new process database structure corresponding to the new process, a list provided in the computer system for storing existing child process database structures corresponding to child processes existing within the executing application, the virtual device driver comprising:

determining means in communication with the system process creation function for determining, upon receiving the Create_Thread signal, that the new process has been created;

calling means for:
 (i) calling the Get_Current_Proccess_Handle function to retrieve the new process database structure, and
 (ii) retrieving, using a pointer in the new process database structure, a parent process database structure corresponding to a parent process of the new process;

comparing means for comparing the parent process database structure with the application process database structure;

identifier means for identifying, if the parent process database structure is the same as the application process database structure, the new process as an existing child process; and adder means for adding, if the new process is identified as the existing child process, the new process database structure to the list of existing child process database structures.

54. The virtual device driver of claim 53, the operating system further having a system process termination function for terminating a process and thereupon providing a Terminate_Thread signal, wherein the Get_Current_Process_Handle function further provides, when called, a terminated process database structure corresponding to the terminated process, the virtual device driver further comprising:

determining means for determining, upon receiving the Terminate_Thread signal, that the process has been terminated;

calling means for calling the Get_Current_Proccess Handle function to retrieve the terminated process database structure;

comparing means for comparing the terminated process database structure with the existing child process database structures in the list;

identifier means for identifying, if the terminated process database structure is the same as one of the existing child process database structures, the terminated process as a terminated child process; and removing means for removing, if the terminated process is identified as the terminated child process, the terminated process database structure from the list of existing child process database structures.

55. A method for monitoring the creation and destruction of child processes within a first application executing in a computer system controlled by an operating system, a second application stored on a storage medium in the computer system for execution, each child process having a corresponding child process database structure, the executing application having a corresponding application process database structure, the method comprising:

providing a list for storing existing child process database structures corresponding to child processes existing within the executing application;

determining whether the list includes any existing child process database structures; and executing, if the list includes no existing child process database structures, the second application.

56. A computer system having an application stored therein for execution and controlled by an operating system, a list provided in the computer system for storing existing child process database structures corresponding to child processes existing within the executing application, the system comprising:

a processor;

a storage medium;

a virtual device driver situated in the storage medium for monitoring the creation and destruction of child processes within the application when executing in the computer system, each child process having a corresponding child process database structure, the executing application having a corresponding application process database structure, the virtual device driver comprising:

a determining part which determines when a new process is created during execution of the application;

a calling part which:
 (i) retrieves a new process database structure corresponding to the new process, and
 (ii) retrieves, using the new process database structure, a parent process database structure corresponding to a parent process of the new process;

a comparing part which compares the parent process database structure with the application process database structure;

an identifier part which identifies, if the parent process database structure is the same as the application process database structure, the new process as an existing child process; and an adding part which adds, if the new process is identified as the existing child process, the new process database structure to the list of existing child process database structures.

57. The computer system of claim 56 wherein the virtual device driver further comprises:

a determining part which determines when a process is terminated during execution of the application;

a calling part which retrieves a terminated process database structure corresponding to the terminated process;

a comparing part which compares the terminated process database structure with the existing child process database structures in the list;

an identifier part which identifies, if the terminated process database structure is the same as one of the existing child process database structures, the terminated process as a terminated child process; and a removing part which removes, if the terminated process is identified as the terminated child process, the terminated process database structure from the list of existing child process database structures.

58. The computer system of claim 56 wherein the operating system is a Windows operating system having a system process creation function for creating the new process and thereupon providing a Create_Thread signal, the operating system further having a Get_Current_Process_Handle function for providing the new process database structure.

59. The computer system of claim 58 wherein the determining part of the virtual device driver is in communication with the system process creation function and determines when the new process is created by receiving the Create_Thread signal.

60. The computer system of claim 58 wherein the calling part of the virtual device driver is in communication with the Get_Current_Process_Handle function and retrieves the new process database structure by calling the Get_Current_Process_Handle function.

61. The computer system of claim 57 wherein the operating system is a Windows operating system having a system process creation function for creating the new process and thereupon providing a Create_Thread signal, and a system process termination function for terminating the process and thereupon providing a Terminate_Thread signal, and a Get_Current_Process_Handle function for providing the terminated process database structure.

62. The computer system of claim 61 wherein the determining part of the virtual device driver is in communication with the system process termination function and determines when the process is terminated by receiving the Terminate_Thread signal.

63. The computer system of claim 61 wherein the calling part of the virtual device driver is in communication with the Get_Current_Process_Handle function and retrieves the terminated process database structure by calling the Get_Current_Process_Handle function.

64. A computer system having an application stored therein for execution and controlled by a Windows operating system, the Windows operating system having a system process creation function for creating a new process and thereupon providing a Create_Thread signal, the operating system further having a Get_Current_Process_Handle function for providing, when called a new process database structure corresponding to the new process, a list provided in the computer system for storing existing child process database structures corresponding to child processes existing within the executing application, the system comprising:

a processor;

a storage medium;

a virtual device driver situated in the storage medium for monitoring the creation and destruction of child processes within the application when executing in the computer system, each child process having a corresponding child process database structure, the executing application having a corresponding application process database structure the virtual device driver comprising:

a determining part in communication with the system process creation function which determines, upon receiving the Create_Thread signal, that the new process has been created;

a calling part which:
(i) calls the Get_Current_Proccess_Handle function to retrieve the new process database structure, and
(ii) retrieves, using a pointer in the new process database structure, a parent process database structure corresponding to a parent process of the new process;

a comparing part which compares the parent process database structure with the application process database structure;

an identifier part which identifies, if the parent process database structure is the same as the application process database structure, the new process as an existing child process; and an adder part which adds, if the new process is identified as the existing child process, the new process database structure to the list of existing child process database structures.

65. The computer system of claim 64, the operating system further having a system process termination function for terminating a process and thereupon providing a Terminate_Thread signal, wherein the Get_Current_Process_Handle function further provides, when called, a terminated process database structure corresponding to the terminated process, the virtual device driver further comprising:

a determining part which determines, upon receiving the Terminate_Thread signal, that the process has been terminated;

a calling part which calls the Get_Current_Proccess_Handle function to retrieve the terminated process database structure;

a comparing part which compares the terminated process database structure with the existing child process database structures in the list;

an identifier part which identifies, if the terminated process database structure is the same as one of the existing child process database structures, the terminated process as a terminated child process; and a removing part which removes, if the terminated process is identified as the terminated child process, the terminated process database structure from the list of existing child process database structures.

\* \* \* \* \*